United States Patent
Triandopoulos et al.

(10) Patent No.: US 9,454,654 B1
(45) Date of Patent: Sep. 27, 2016

(54) MULTI-SERVER ONE-TIME PASSCODE VERIFICATION ON RESPECTIVE HIGH ORDER AND LOW ORDER PASSCODE PORTIONS

(71) Applicant: EMC Corporation, Hopkinton, MA (US)

(72) Inventors: Nikolaos Triandopoulos, Arlington, MA (US); Ari Juels, Brookline, MA (US); Ronald L. Rivest, Arlington, MA (US); John Brainard, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 117 days.

(21) Appl. No.: 14/144,707

(22) Filed: Dec. 31, 2013

(51) Int. Cl.
*G06F 21/31* (2013.01)
*H04L 25/03* (2006.01)

(52) U.S. Cl.
CPC ......... *G06F 21/31* (2013.01); *H04L 25/03929* (2013.01)

(58) Field of Classification Search
CPC .......................... H04L 25/03929; G06F 21/31
USPC .................................................. 726/7; 380/28
See application file for complete search history.

(56) References Cited

U.S. PATENT DOCUMENTS

| 7,725,730 B2 * | 5/2010 | Juels et al. ..................... 713/183 |
| 2004/0023677 A1 * | 2/2004 | Mano et al. ................... 455/500 |
| 2004/0073787 A1 * | 4/2004 | Ban et al. ...................... 713/159 |

* cited by examiner

*Primary Examiner* — Dao Ho
(74) *Attorney, Agent, or Firm* — Ryan, Mason & Lewis, LLP

(57) ABSTRACT

Multi-server one-time passcode verification is provided for respective high order and low order passcode portions. A user is authenticated by receiving an authentication passcode generated by a token associated with the user; and authenticating the user based on the received authentication passcode using at least a first authentication server and a second authentication server, wherein the first authentication server verifies a high-order portion of the received authentication passcode and wherein the second authentication server verifies a low-order portion of the received authentication passcode. The received authentication passcode is based on, for example, at least two protocodes $P_{R,t}$ and $P_{B,t}$ generated by the token and/or pseudorandom information $R_{A,t}$. A codebook $C_t$, based on the pseudorandom information $R_{A,t}$, can be used to embed additional auxiliary information into the authentication passcode.

24 Claims, 12 Drawing Sheets

FIG. 8B

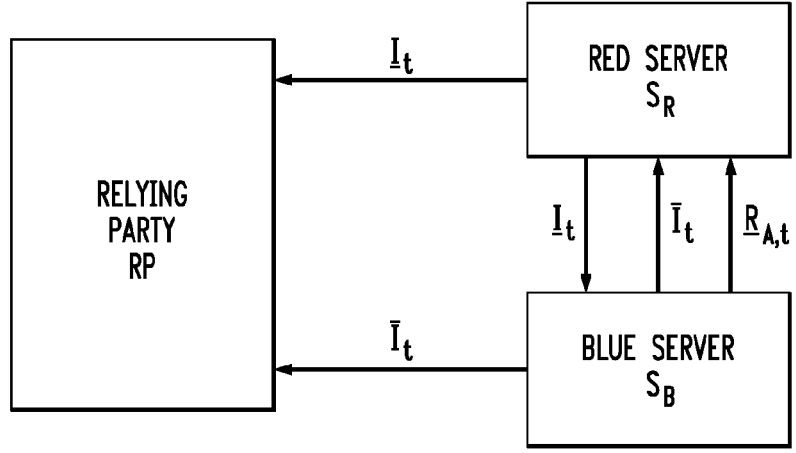

COMPUTE INTERSECTION $I' = \underline{I}_t \cap \bar{I}_t$
CONVERT LOW ORDER BINARY
CODEWORD $\underline{q}_{I'}$ TO DIGITAL $\underline{c}_{I'}$
OUTPUT $\underline{I}_t$ IF $\underline{c}_{I'} = \underline{d}_t$ COMPUTE INTERSECTION $I' = \underline{I}_t \cap \bar{I}_t$
SEND PSEUDORANDOMNESS $\underline{R}_{A,t}(I')$
CONVERT HIGH ORDER BINARY
CODEWORD $\bar{q}_{I'}$ TO DIGITAL $\bar{c}_{I'}$
OUTPUT $\bar{I}_t$ IF $\bar{c}_{I'} = \bar{d}_t$

MULTI-SERVER ONE-TIME PASSCODE VERIFICATION ON RESPECTIVE HIGH ORDER AND LOW ORDER PASSCODE PORTIONS

FIELD

The field relates generally to authentication, and more particularly to multi-server authentication.

BACKGROUND

One-time authentication tokens produce a series of unpredictable one-time passcodes (OTPs) as second authentication factors for the authentication of users to remote servers. One-time authentication tokens implement the general solution concept of second factor authentication, thus offering stronger user authentication. Passcodes are typically generated in an unpredictable manner by extracting pseudo-randomness from an initial seed, that is stored at the token and shared with the server. Thus, the security of one-time authentication tokens is based on the secrecy and protection of the token's seed, in particular, against an attacker that directly compromises the server, either ephemerally to get the secret seed or permanently to tamper with the verification process.

Split-server verification employs at least two verification servers, each keeping a distinct secret state, as well as distributed cryptography to implement a joint user-authentication protocol that tolerates certain compromise of one or more servers. See, for example, U.S. Pat. No. 7,725,730. Similar split-server OTP verification protocols have been proposed to make one-time authentication tokens resilient to certain type of server-side attacks. U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661), employs cryptography, and U.S. patent application Ser. No. 13/795,801, filed Mar. 12, 2013, entitled "Distributed Cryptography Using Distinct Value Sets Each Comprising at Least One Obscured Secret Value," does not support an auxiliary channel (for a discussion of auxiliary channels, see, for example, U.S. patent application Ser. No. 13/404,780, filed Feb. 24, 2012, entitled "Method and Apparatus for Embedding Auxiliary Information in One-Time Passcode Authentication Tokens" (now U.S. Pat. No. 8,984,780)).

A need therefore exists for efficient multi-server OTP verification protocols that are compatible with the existence of an auxiliary channel, while providing high levels of server-side security.

SUMMARY

Illustrative embodiments of the present invention provide multi-server one-time passcode verification of respective high order and low order passcode portions. In one embodiment, a user is authenticated by receiving an authentication passcode generated by a token associated with the user; and authenticating the user based on the received authentication passcode using at least a first authentication server and a second authentication server, wherein the first authentication server verifies a high-order portion of the received authentication passcode and wherein the second authentication server verifies a low-order portion of the received authentication passcode.

The received authentication passcode is based on, for example, at least two protocodes $P_{R,t}$ and $P_{B,t}$ generated by the token and/or pseudorandom information $R_{A,t}$. A codebook $C_t$, based on the pseudorandom information $R_{A,t}$, can be used to embed additional auxiliary information into the authentication passcode.

In one exemplary embodiment, the first authentication server and the second authentication server return a verification to a relying party RP indicating whether a respective portion of the received authentication passcode has been partially verified. The relying party RP authenticates the user if both the first authentication server and the second authentication server verify a respective portion of the received authentication passcode. The first authentication server computes high order auxiliary information comprising a high order candidate codeword embedded in the received authentication passcode and determines one or more high order matching indices between the high order embedded codeword and a high order portion of a codeword of a corresponding codebook and wherein the second authentication server computes low order auxiliary information comprising a low order candidate codeword embedded in the received authentication passcode and determines one or more low order matching indices between the low order embedded codeword and a low order portion of a codeword of a corresponding codebook. The relying party RP accepts the received authentication passcode if the high order matching indices and low order matching indices have a non-empty intersection.

Embodiments of the invention can be implemented in a wide variety of different authentication applications, including, for example, verification of one-time passcodes (OTPs).

DETAILED DESCRIPTION

Figures 1, 2:
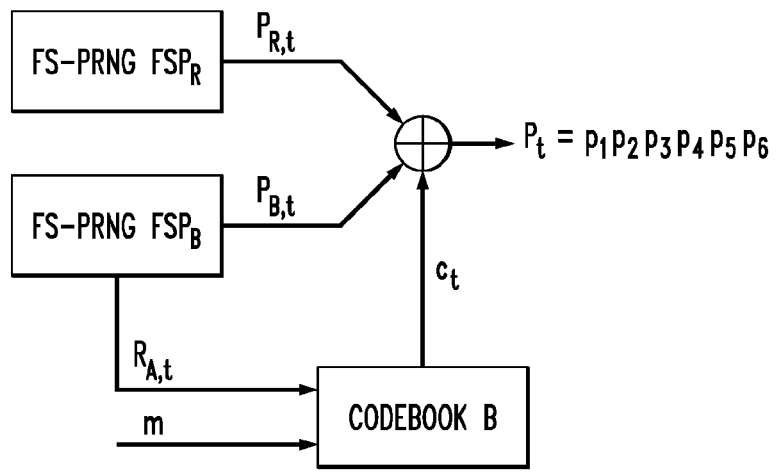
FIG. 1 illustrates an exemplary client-side generation of passcodes that are enriched by auxiliary information by a token.
FIG. 2 illustrates an exemplary vertical split-server passcode verification scheme incorporating aspects of the present invention, where each server verifies a high-order portion or a low-order portion, respectively, and optionally extracts a portion of an embedded auxiliary information by processing a corresponding high-order codebook or low-order codebook, respectively.

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides efficient split-server OTP verification protocols that are compatible with the existence of an auxiliary channel, while providing high levels of server-side security. According to one aspect of the invention, a "vertical-split" verification protocol is provided where different servers are responsible for verifying different portions (substrings) of the submitted passcode. According to another aspect of the invention, a method is provided for extending any general split-server OTP verification protocol without auxiliary-channel support to one that supports an auxiliary channel.

As previously indicated, passcodes are typically generated on a regular time basis, i.e., in specified time intervals often called epochs (e.g., the widely used SecurID™ token produces a new OTP every minute). Passcodes are derived by using a secret state, called a seed, that is stored at the token and also shared with the server. Tokens can either be based on software or hardware. Software tokens produce passcodes on-demand, whenever the token's application is launched in the host device, where a series of passcodes is generated for the epochs following the launching of the application. Hardware tokens produce passcodes on a permanent basis, one passcode per epoch, for the entire lifetime of their battery (e.g., for five years from the time of manufacture). Overall, such tokens produce a time-based series of unpredictable OTPs by extracting pseudorandom bits from their seed which are converted to passcodes.

There are three main steps in the functionality of one-time authentication tokens.

1. A passcode $P_{t'}$ is produced in time epoch t' through a one-way cryptographic function $f$ applied on the current epoch t', and the seed σ of the token. Software tokens specify their current epoch based on the current time of the host device, whereas hardware tokens specify their epoch implicitly using a counter.

2. A passcode $P_{t'}$ may then be transmitted to an authentication server to authenticate a user to the server. The transmission of the passcode $P_{t'}$ to the server may happen either by typing performed by the user or automatically by a software token that is directly communicating to the server through a communication channel offered by the host device.

3. On receiving a candidate passcode $P_{t'}$, the server verifies this passcode by contrasting the received passcode against the passcode $P_t$ that is locally computed by the server, accepting the passcode if and only if $P_t = P_{t'}$. If the passcode is not accepted, the user is not authenticated. Otherwise, the user is authenticated if and only if a user's corresponding PIN is correct. Passcode $P_t$ is computed by the server by applying the same function $f$ on the current epoch t' specified by the server's current time and the seed σ of the token stored at the server. To tolerate small discrepancies between the current time of the software (or hardware) token and the current time of the server, $P_{t'}$ is also contrasted against another 2s passcodes that are defined by epochs that are neighboring epochs to the server's epoch t, that is, to passcodes $\{P_{t-s}, \ldots, P_{t-1}, P_t, P_{t+1}, \ldots, P_{t+s}\}$.

Passcodes are produced by applying a one way function $f$ on the token's seed. As long as the seed remains a secret, protected against leakage to an attacker, future passcodes remain unpredictable even if an attacker has observed an arbitrarily long history of passcodes produced in the past.

Protections Against Seed Leakge

The security of any one-time authentication token collapses if an attacker gets access to the secret seed of the token. Using the seed, the attacker can clone the token and thus reconstruct the series of passcodes that the token will ever produce. In turn, the attacker can increase its chances for impersonating the corresponding user, by either performing a brute-force attack on the user's PIN or by launching a more sophisticated man-in-the-middle attack for harvesting the user's PIN. In reality, the fact that the security of the token is based on a secret seed will motivate the attacker to go after this secret seed by following one of the following three attack patterns:

1. Server Compromise: The attacker may compromise the authentication server and get the secret seed of the token of one or more users. The attacker may compromise the server ephemerally by instantly stealing the seed(s) and then terminating the attack, or permanently by remaining in control of the server for a long period of time, thus directly being able to impersonate one or more users.

2. Token Tampering or Compromise: The attacker may compromise the token and get its secret seed either by performing a direct attack against the host device of a software token (using some malware, trojan, or virus installed on the device or through some network-based attack), thus fully bypassing any protection mechanisms being in place by the token application for restricting access to the token's seed, or by physically tampering with a hardware token to directly read its seed, e.g., by opening the case of the token and reading the full internal state of the token at the time of compromise.

3. Seed-Record Capturing: The attacker may get the secret seed of the token indirectly by attacking a storage or communication unit used to store or transfer the token's seed, or through side-channel attacks performed against the token or the server.

Although conventional one-time authentication tokens are vulnerable to all such seed-leakage attacks, a general solution has been recently proposed in U.S. patent application Ser. No. 13/837,259, filed Mar. 15, 2013, entitled "Configurable One-Time Authentication Tokens with Improved Resilience to Attacks," (now U.S. Pat. No. 9,270,259), that involves the design of a configurable one-time authentication token that is equipped with several intrusion-detection, intrusion-resilience, tamper-resistance and token-visibility technologies that protect against the above attacks. This design employs one or more of the following three protection layers:

High Layer Protection: High layer protection optionally employs one or more of the following intrusion-detection, and intrusion-resilience techniques: split-server passcode verification (U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661)), silent alarms (U.S. patent application Ser. No. 13/404,788, filed Feb. 24, 2012, entitled "Methods and Apparatus for Silent Alarm Channels Using One-Time Passcode Authentication Tokens") and drifting keys (U.S. patent application Ser. No. 13/250,225, filed Sep. 30, 2011, entitled "Key Update With Compromise Detection").

Low Layer Protection: Low layer protection optionally employs one or more of the following tamper-resistance techniques: forward-secure pseudorandom number generators (U.S. patent application Ser. No. 13/334,709, filed Dec. 23, 2011, entitled "Methods and Apparatus for Generating Forward Secure Pseudorandom Numbers" (now U.S. Pat. No. 9,008,303)), use of a source of randomness at the token, and randomized state transitions (U.S. patent application Ser. No. 13/828,588, filed Mar. 14, 2013, entitled "Randomizing State Transitions for One-Time Authentication Tokens").

Intermediate Layer Protection: Intermediate layer protection optionally employs one or more of the following token-visibility techniques: data-transaction signing (U.S. patent application Ser. No. 13/826,924, filed Mar. 14, 2013, entitled "Event-Based Data-Signing Via Time-Based One-Time Authentication Passcodes," (now U.S. Pat. No. 9,225, 717), incorporated by reference herein), auxiliary channels (U.S. patent application Ser. No. 13/404,780, filed Feb. 24, 2012, entitled "Method and Apparatus for Embedding Auxiliary Information in One-Time Passcode Authentication Tokens" (now U.S. Pat. No. 8,984,609)) and time synchronization (U.S. patent application Ser. No. 13/826,993, filed Mar. 14, 2013, entitled "Time Synchronization Solutions for Forward-Secure One-Time Authentication Tokens," U.S. patent application Ser. No. 13/728,271, filed Dec. 27, 2012, entitled "Time Synchronisation and Forward Clock Attack" (now U.S. Pat. No. 9,083,515)).

Most of the above techniques are based on the following three security mechanisms:

1. Forward-Secure Pseudorandom Number Generator (FS-PRNG): Forward security can be applied to management of the internal state of one-time authentication tokens. Instead of using a fixed global secret state, e.g., a seed, for the entire lifetime of the token, the secret state can evolve over time in a one-way cryptographic manner so that older states cannot be computed from newer states (e.g., new seeds may be computed using a one-way hash chain). More elaborate hierarchical hashing schemes are possible that improve the server-side performance with respect to management of time-evolving seeds. See, for example, U.S. patent application Ser. No. 13/334,709, filed Dec. 23, 2011, entitled "Methods and Apparatus for Generating Forward Secure Pseudorandom Numbers," (now U.S. Pat. No. 9,008, 303).

2. Split-Server Passcode Verification: Split-server passcode verification is a solution concept for tolerating server compromise(s) in systems that employ one-time authentication tokens. Split-server passcode verification involves employing distributed cryptographic techniques for dispersing the task of verifying a candidate passcode (provided by a user or token) among two or more verification servers so that each such participating server $S_t$ stores only a partial secret state $\sigma_t$. Generally, the token's seed a is split or shared into two or more pieces each managed by a separate server. One security property is that verification is securely implemented in a distributed manner, yet leakage of one or more, but up to a specified threshold, partial secret states does not compromise the security of the token. See, for example, U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661).

Typically, the seed is split into two pieces, often called the red and the blue partial seeds, produced respectively by two distinct FS-PRNGs, the red FS-PRNG $FSP_R$ and the blue FS-PRNG $FSP_B$. Accordingly, two verification servers are employed: the red server stores the red seed that evolves through $FSP_R$ and the blue server stores the blue seed that evolves through $FSP_B$. Upon receiving a candidate passcode $P_{t'}$, the two servers interact through a secure protocol to jointly compute the passcode $P_t$ against which the candidate passcode is contrasted, and accordingly $P_{t'}$ is rejected if any of the two servers output "reject." This decision is typically made by a so-called relying server that is stateless and responsible for the final decision about the acceptance of $P_{t'}$ based on the individual outputs of the red and the blue servers.

The additional feature of proactivization can be used according to which the partial states of the (e.g., two) servers evolve over time and where the servers periodically exchange secure descriptions (e.g., hashes) of their partial secret states, which are then used to create their new partial secret states.

3. Auxiliary Channel: A small (e.g., 4) number of auxiliary information bits can be embedded into the produced passcodes of a token that, in turn, can be reconstructed by the server, thus implementing a low-bandwidth auxiliary channel between the token and the server. Such channels are designed so that they are resilient to small-digit typographical errors performed by the user transcribing a passcode: An error correction code coming from a randomly selected, secret and passcode-specific codebook $C_t$ is used to encode the auxiliary word that is to be embedded into the passcode, and this embedding corresponds to adding the resulted codeword to the initial passcode using some associative binary operation (e.g., digit-wise addition modulo 10). As specified in U.S. patent application Ser. No. 13/837,259, filed Mar. 15, 2013, entitled "Configurable One-Time Authentication Tokens with Improved Resilience to Attacks," (now U.S. Pat. No. 9,270,655), in the split-server mode of operation, the codebook $C_t$ evolves over time using pseudorandomness produced by only one of the two employed FS-PRNGs, by convention the blue FS-PRNG $FSP_B$; that is, the auxiliary-channel embedded codeword is associated with the blue FS-PRNG and, thus, produced only by the blue server. See, for example, U.S. patent application Ser. No. 13/404,780, filed Feb. 24, 2012, entitled "Method and Apparatus for Embedding Auxiliary Information in One-Time Passcode Authentication Tokens," (now U.S. Pat. No. 8,984,609).

Lightweight Split-Server Verification

Unfortunately, previous split-server passcode verification schemes tend to be less practical for wide deployment in realistic high-traffic authentication setting, where possibly hundreds of thousands of users are authenticated through one authentication server. This is because these schemes involve the repeated use of some rather involved cryptographic protocols as well as some relatively high communication costs. In particular, one scheme involves the use of a commitment scheme, namely, it involves a constant number of rounds where each round requires two commitments and two de-commitment operations. Similarly, another (more secure) scheme requires the use of secure multiparty computation, namely, it involves the digit-by-digit secure equality testing.

To increase the practicality of one-time authentication tokens, it is important to consider lightweight versions of split-server passcode verification, e.g., through schemes that are not based on the use of cryptography. Such benefits in performance, however, may come at the possible cost of reduced security.

Recently, such non-cryptographic split-server passcode verification scheme was described in U.S. patent application Ser. No. 13/795,801, filed Mar. 12, 2013, entitled "Distributed Cryptography Using Distinct Value Sets Each Comprising at Least One Obscured Secret Value." The technique is generally based on the use of chaff sets, according to which, at time epoch t each server stores a fixed-size set of passcodes that contains the correct passcode $P_t$: the red server stores set $K_{t,R}$ and the blue server stores set $K_{t,B}$ so that $P_t = K_{t,R} \cap K_{t,B}$, $|K_{t,B}| = |K_{t,R}| = l$. That is, chaff sets provide a natural trade-off between security and performance: A server compromise reveals the chaff set and the attacker has 1/l success probability towards user impersonation, but passcode verification now involves only two independent (and therefore non-interactive) easy-to-perform set-inclusion checks, namely, that $P_t' \in K_{t,B}$ and $P_t' \in K_{t,R}$. Applying this idea to tokens is slightly more involved, as sets $K_{t,B}$ and $K_{t,R}$ cannot be precomputed in advance, but rather must be produced on demand, this time jointly (with interaction) between the red and blue servers. It has been shown that it is possible to have these chaff sets computed implicitly using chaff-set hints sent by each other server.

Specifically, chaff sets are constructed on the fly as follows. For a given time t, the red and blue servers, $S_R$ and $S_B$, can compute their respective shares $P_{R,t}$ and $P_{B,t}$, such that $P_t = P_{R,t} + P_{B,t}$. Rather than exchanging their shares directly, the red and blue servers, $S_R$ and $S_B$, exchange share "hints"—share values that define chaff sets of optimal (maximum) size $\sqrt{p}$, where p is the size of the passcode space.

Exemplary Server $S_R$ operates as follows. Let $\Sigma_R = \{\sigma_{R,0}, \ldots, \sigma_{R,l-1}\}$, known to both the servers. The set $\Sigma_R$ is a fixed sequence of offsets that serves to construct $S_R$'s chaff set $K_{t,R}$. The general idea behind construction of $K_{t,R}$ is for server $S_B$ to construct a sequence of values that includes $P_{B,t}$. This sequence is centered on a random element $\sigma_{R,j}$ in $\Sigma_R$; other elements of $\Sigma_R$ serve as offsets defining chaff values. By adding $P_{R,t}$ to each element of this set, $S_R$ obtains a chaff set $K_{t,R}$. Within $K_{t,R}$ is embedded the full, valid passcode $P_t$, along with chaff values. In particular:

1. Server $S_B$ selects an index $j_{t,B} \in_R \mathbb{Z}_l$ and sends $s_R = P_{B,t} - \sigma_{R,j_B}$ to server $S_R$.
2. Server $S_R$ constructs chaff set $$K_{t,R} = \{\sigma_{R,i} + s_R + P_{R,i}\}^{i \in \mathbb{Z}_l}.$$

Above, regular addition operator + can be alternatively replaced by digit-wise modulo 10 addition operator $\oplus$.

Server $S_B$ generates its chaff set by operating analogously using a fixed sequence of offsets $\Sigma_B = \{\sigma_{B,0}, \ldots, \sigma_{B,l-1}\}$. The above protocol guarantees that $P_t \in K_{t,R}$ and $P_t \in K_{t,B}$. By choosing $\Sigma_R = \mathbb{Z}_l$;

$\Sigma_B = \{l, 2l, \ldots, l^2\}$, as the two public offsets sets, for $l = \sqrt{p}$, one can guarantee that $P_t = K_{t,R} \cap K_{t,B}$ and that the chaff set size is maximized. Maximizing the chaff set size is important, because an adversary compromising one of the two servers can at best guess a valid passcode from its locally computed chaff set, an event happening with probability $1/|K_{t,R}| = 1/|K_{t,B}|$; thus, minimizing this probability to $1/\sqrt{p}$ essentially means that a breach of one server halves the effective length of the passcodes, say from 6 digits to 3 digits, as the adversary has to guess the missing 3 digits.

However, the disclosed non-cryptographic split-server passcode verification scheme is not compatible with the existence of an auxiliary channel. In other words, the disclosed scheme operates only in the case where no auxiliary channel exists. It is therefore important to design a new split-server passcode verification scheme that is both lightweight and supports an auxiliary channel in the token.

Verification Scheme

According to one aspect of the invention, a split-server passcode verification scheme is provided that is lightweight and fully compatible with the existence of an auxiliary channel between the token and the authentication servers.

Setting

While the disclosed scheme is general enough to operate with a wide range of token designs, the following exemplary embodiment employs the client-side design of U.S. patent application Ser. No. 13/837,259, filed Mar. 15, 2013, entitled "Configurable One-Time Authentication Tokens with Improved Resilience to Attacks," (now U.S. Pat. No. 9,270, 655). FIG. 1 illustrates an exemplary client-side generation of passcodes by a token 100. As shown in FIG. 1, the exemplary token 100 comprises a red and a blue FS-PRNG, $FSP_R$ and $FSP_B$, respectively, that produce protocodes $P_{R,t}$ and $P_{B,t}$, respectively, for each epoch t. Additionally, the blue FS-PRNG $FSP_B$ produces pseudorandom information $R_{A,t}$ that is used for the passcode-specific pseudorandom generation of a codebook $C_t$ which, in turn, is optionally used by the auxiliary channel to embed additional information into the two produced protocodes, finally producing the transmitted passcode $P_t$.

In particular, the exemplary auxiliary channel operates as follows. The embedded message m consists of a small number of k bits. A fixed (and possibly known) binary codebook B is used to map (through mapping $B(\cdot)$) a k-bit message $m = m_{k-1}, m_{k-2}, \ldots m_0$, into a binary codeword $q = B(m) = q_{l-1}, q_{l-2}, \ldots q_0$, of size l, where l equals the number of digits in the final passcode. Here, typical values are as follows: k=4 and l=6 or l=8. Thus, B can take the form of a [8, 4, 4] or [6, 4, 2] error correcting code (specifically, the [8, 4, 4] extended Hamming code or a corresponding [6, 4, 2] Hamming code). Then, using pseudorandom bits in $R_{A,t}$, the auxiliary channel maps (through mapping $C_t(\cdot)$) codeword q to an l-bit digital codeword $c_t = C_t(q) = c_{l-1}, c_{l-2}, \ldots c_0$, as follows: if $q_{i,t} \neq 0$ then $c_{i,t}$ is randomly selected from $\{1,2,3,4,5,6,7,8,9\}$ else $c_{i,t} = 0$. Note that with this mapping, any two digital codewords $C_t(B(m))$ and $C_t(B(m'))$ have Hamming distance that is at least the Hamming distance between their corresponding binary codewords $B(m)$ and $B(m')$; thus, mapping $C_t$ can be itself considered a Hamming code (over zero and non-zero digits).

Finally, the final exemplary passcode $P_t$ is computed using digit-wise modulo 10 addition of $P_{R,t}$, $P_{B,t}$ and $c_t$, denoted here using operator $\oplus$ as $P_{R,t} \oplus P_{B,t} \oplus c_t$. In this manner, the final exemplary passcode $P_t$ optionally embeds the auxiliary information from the k-bit message m that has been mapped into the codeword $c_t$. Thus, the final exemplary passcode $P_t$ can be referred to as an auxiliary-information enriched passcode. That is, if $P_t=p_{l-1},p_{l-2},\ldots p_{0,t}$, $P_{R,t}=r_{l-1},r_{l-2},\ldots r_{0,t}$ and $P_{B,t}=b_{l-1},b_{l-2},\ldots b_{0,t}$ (where $p_{i,t}, r_{i,t}, b_{i,t}, 0\leq i\leq l-1$ are all digits), then for $0\leq i\leq l-1$:

$$p_{i,t}=r_{i,t}+b_{i,t}+c_{i,t} \bmod 10.$$

Similarly, operator $\ominus$ denotes digit-wise modulo 10 subtraction, used to appropriately solve the above equation to one of two protocodes $P_{R,t}$ and $P_{B,t}$ or the codeword $c_t$.

To facilitate the description of the disclosed split-server passcode verification scheme, some notation is introduced related to the representations of $P_t$, $P_{R,t}$, $P_{B,t}$ and $c_t$ as l-digit digital-number strings. An l-digit numeric string $s=s_{l-1}s_{l-2}\ldots s_0$, where, without loss of generality, l is even, can also be viewed as the concatenation of the high-order (or most significant) and the low-order (or least significant) (l/2)-digit strings $\bar{s}=s_{l-1}s_{l-2}\ldots s_{l/2}$ and $\underline{s}=s_{(l/2)-1}s_{(l/2)-2}\ldots s_0$, i.e., $$s=\bar{s}\|\underline{s},$$

or simply $$s=\bar{s}\underline{s}.$$

It is noted that while the present invention is illustrated herein using a high-order (or most significant) half and a low-order (or least significant) half of the protocode, the invention can be applied using high-order (or most significant) portions and low-order (or least significant) portions of the protocode that have an unequal length.

Accordingly, if codebooks B and $C_t$ are seen as $2^k \times l$ matrices then, similarly, the high-order (or most significant) portion $\bar{B}, \bar{C}_t$ and the low-order (or least significant) portion $\underline{B}, \underline{C}_t$ can be considered parts of them, which are $2^k \times l/2$ matrices.

Server-Side Verification Protocol

The disclosed exemplary split-server passcode verification scheme splits the verification process across the two servers according to the high-order versus low-order partition of the passcode into two equally size parts in the exemplary embodiment. The passcode may be an auxiliary-information enriched passcode. That is, in the case of such auxiliary-information enriched passcodes, unlike some existing split verification methods that divide the passcode "horizontally," where each server possesses a secret share of the protocode $P_{R,t} \oplus P_{B,t}$ and where both servers need to reconstruct and verify passcode $P_{R,t} \oplus P_{B,t} \oplus c_t$, the disclosed split-server passcode verification scheme, shown in FIG. 2, divides the passcode "vertically," where each server still possesses a secret share of the protocode $P_{R,t} \oplus B_{B,t}$ but now each server is responsible for reconstructing and verifying only the high-order portion $\bar{P}_{R,t} \oplus \bar{P}_{B,t} \oplus \bar{c}_t$ and, respectively, the low-order portion $\underline{P}_{R,t} \oplus \underline{P}_{B,t} \oplus \underline{c}_t$. This idea is effective in yielding efficient split-server verification protocols. However, the existence of an auxiliary channel that is maintained by only one of the two servers introduces some additional challenges.

Moreover, the disclosed protocols consider the interaction between the two authentication servers, the blue $S_B$ and the red $S_R$ server, with one trusted relying party, a server RP to which the final access-control/authentication decision is handed and which interacts with the high-level application that the end user of the token is interested in accessing.

Figure 3:
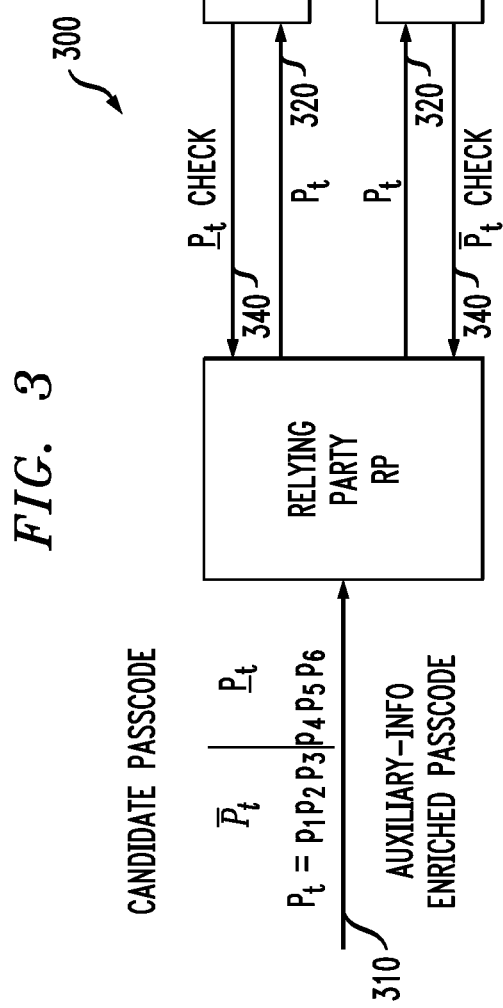
FIG. 3 illustrates an exemplary split-server passcode verification process incorporating aspects of the invention with reference to the verification scheme of FIG. 2.

FIG. 3 illustrates an exemplary split-server passcode verification process 300 incorporating aspects of the invention with reference to the verification scheme of FIG. 2. As shown in FIG. 3, the exemplary split-server passcode verification process 300 is initiated during step 310 when an auxiliary-information enriched candidate passcode $P_t$ is presented to a relying party RP. It is noted that the exemplary relying party RP does not store the secret seed of the user.

The candidate passcode $P_t$ is provided to each server $S_B$ and $S_R$ during step 320. As indicated above in conjunction with FIG. 1, the candidate passcode $P_t$ supports the auxiliary channel. The candidate passcode $P_t$ is thus a passcode that optionally embeds auxiliary information. The two servers $S_B$ and $S_R$ exchange information during step 330, as discussed further below in conjunction with FIG. 5. Finally, the servers $S_B$ and $S_R$ return a verification-related output to the relying party RP during step 340 indicating whether their respective portion has been verified. The final verification performed by the relying party RP is discussed further below in conjunction with FIG. 9. Generally, the relying party RP authenticates the user if and only if both servers $S_B$ and $S_R$ verify their respective portion of the candidate passcode $P_t$. These individual verifications of respective portions of the passcode may be implicit: The final verification may actually be performed at the relying party RP based on verification-related information outputted by the two servers. As discussed hereinafter, the verification protocol can comprise, for example, the vertical splitting techniques described herein.

Exemplary Verification Protocol $\Pi_t$ for an Epoch t

During the verification process, one server, here by exemplary convention, the blue server, is responsible for verifying the high-order portion of the passcode, and the second server, here by exemplary convention, the red server, is responsible for verifying the low-order portion of the passcode. In addition to the candidate passcode at the beginning of the verification process, the two servers, blue and red, each have the following inputs for any given epoch t (within a certain search window, such as an exemplary duration of 70 epochs):

The blue server possesses pseudorandomness $R_{A,t}$, binary codebook B and the blue protocode $P_{B,t}=\bar{P}_{B,t}\underline{P}_{B,t}$.

The red server possesses the red protocode $P_{R,t}=\bar{P}_{R,t}\underline{P}_{R,t}$.

Figure 4:
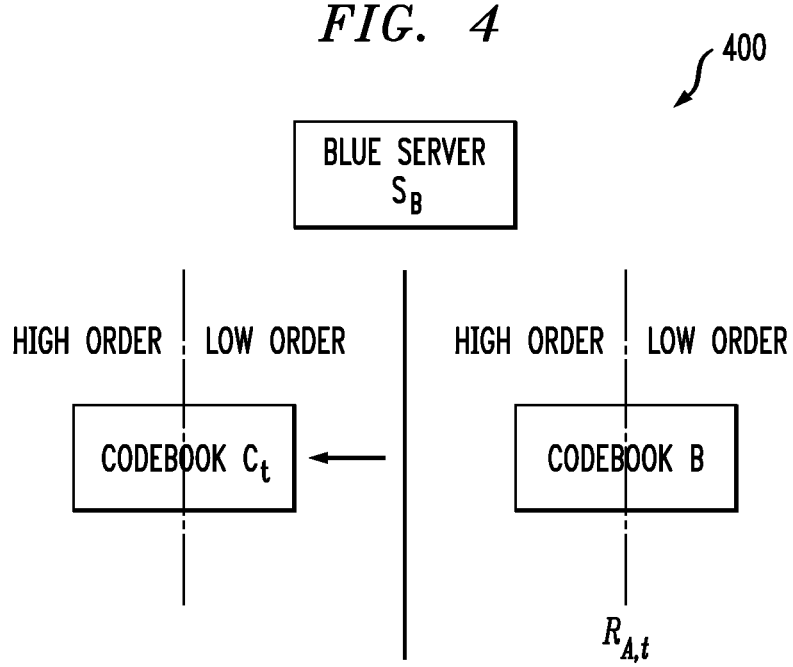
FIG. 4 illustrates an exemplary preprocessing portion of the disclosed split-server passcode verification scheme of FIG. 3.

The exemplary verification protocol $\Pi_t$ then runs as follows for a given epoch t:

FIG. 4 illustrates an exemplary preprocessing portion 400 of the disclosed split-server passcode verification scheme 300. As shown in FIG. 4, Server $S_B$ uses pseudorandomness $R_{A,t}$ and binary codebook B to compute the digital codebook $C_t=\bar{C}_t\underline{C}_t$ for epoch t, using the mapping techniques discussed above in the section entitled "Setting."

Figure 5:
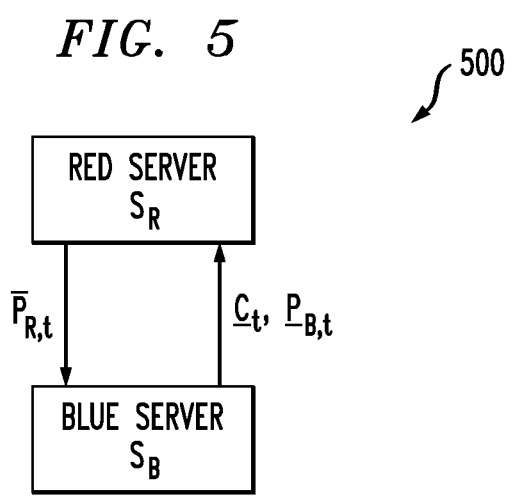
FIG. 5 illustrates an exemplary first phase portion of the disclosed split-server passcode verification scheme of FIG. 3.

FIG. 5 illustrates an exemplary first phase portion 500 of the disclosed split-server passcode verification scheme 300. As shown in FIG. 5, during the first phase 500, the two servers exchange information as follows:

$S_B$ sends $\{\underline{C}_t,\underline{P}_{B,t}\}$ to $S_R$.

$S_R$ sends $\bar{P}_{R,t}$ to $S_B$.

Figure 6A:
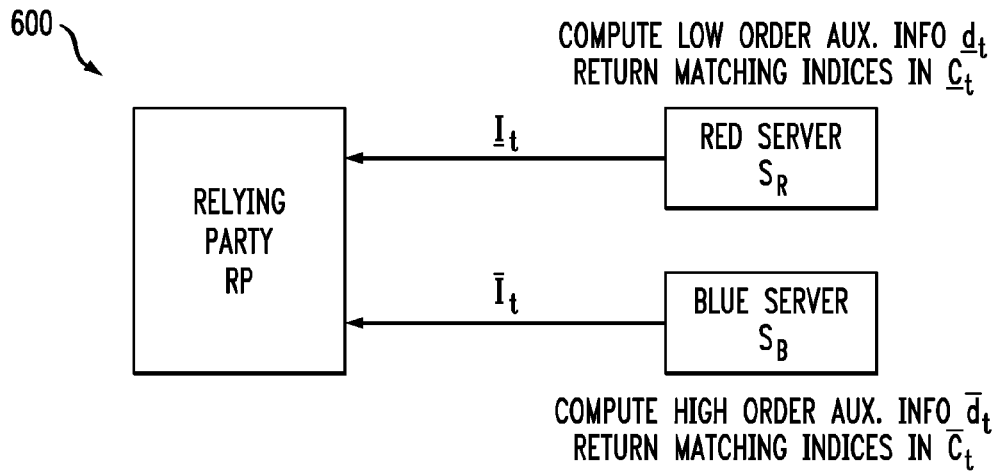
FIG. 6A and FIG. 6B illustrate an exemplary second phase portion and a verification phase portion of the disclosed split-server passcode verification scheme of FIG. 3, respectively.
Figure 6B:
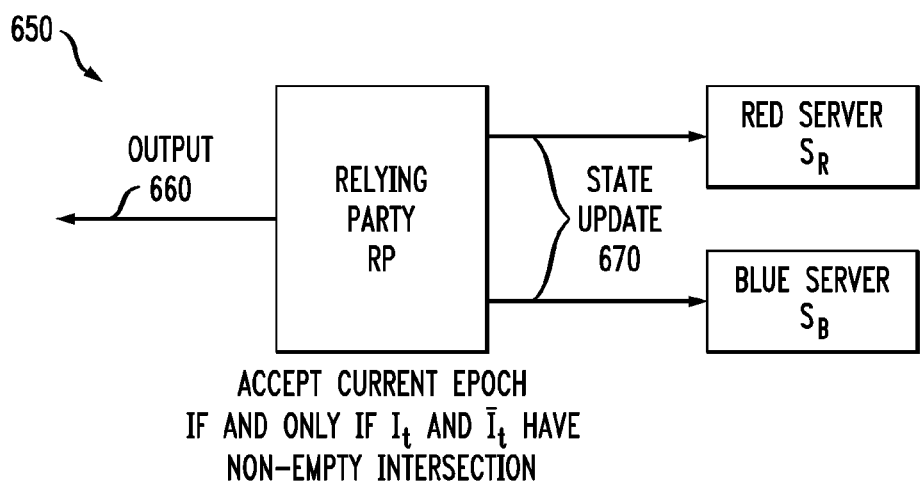

FIGS. 6A and 6B illustrate an exemplary second phase portion 600 and a verification phase portion 650 of the disclosed split-server passcode verification scheme 300, respectively. As shown in FIG. 6A, during the second phase 600, each server verifies the respective high-order or low-order portion of the passcode:

The blue server $S_B$ performs the following steps:

i. set index $\bar{I}_t$ to $\emptyset$;

ii. compute high order auxiliary information $\bar{d}_t=\bar{P}'_t \ominus \bar{P}_{R,t} \ominus \bar{P}_{B,t}$; It is noted that any references to "$\ominus$" in the equations herein are intended to be a reference to the mathematical symbol "$\ominus$" for digit-wise modulo 10 subtraction.

iii. for each $\bar{c}_j \in \bar{C}_t$, $1 \leq j \leq 2^k$, check if $\bar{c}_j=\bar{d}_t$ and if yes, then set index $\bar{I}_t \leftarrow \bar{I}_t \cup j$;

iv. output index $\bar{I}_t$ to Relying Party RP containing matching indices in $\bar{C}_t$.

The red server $S_R$ performs the following steps:

i. set index $\underline{I}_t$ to $\emptyset$;

ii. compute to low order auxiliary information $\underline{d}_t = \underline{P}'_t \ominus \underline{P}_{R,t} \ominus \underline{P}_{B,t}$;

iii. for each $\underline{c}_j \in \underline{C}_t$, $1 \leq j \leq 2^k$, check if $\underline{c}_j = \underline{d}_t$ and if yes, then set index $\underline{I}_t \leftarrow \underline{I}_t \cup j$; iv. output index $\underline{I}_t$ to Relying Party RP containing matching indices in $\underline{C}_t$.

For the above execution of protocol $\Pi_t$:

$$(\overline{I}_t, \underline{I}_t) \leftarrow \Pi_t(P', R_{A,t}, P_{B,t}, P_{R,t}).$$

General Verification Protocol

Given protocol $\Pi_t$ as a subroutine, the exemplary general verification protocol can be described as follows:

1. Relying Party RP initializes $A \leftarrow \emptyset$ and ans$\leftarrow$reject;

2. For each epoch t in the search window of length $2s+1$ epochs and using a certain ordering D of the epochs:

Run protocol $\Pi_t$ as $(\overline{I}_t, \underline{I}_t) \leftarrow \Pi_t(P', R_{A,t}, P_{B,t}, P_{R,t})$ to have servers $S_B$ and $S_R$ produce outputs $\overline{I}_t$ and $\underline{I}_t$ respectively, as shown in FIG. 6A;

Server $S_B$ sends $\overline{I}_t$ to Relying Party RP and Server $S_R$ sends $\underline{I}_t$ to Relying Party RP, as shown in FIG. 6A;

Relying Party RP accepts the passcode P' with respect to epoch t and updates $A \leftarrow A \cup \{t, i_t\}$ if and only if $\overline{I}_t \cap \underline{I}_t \neq \emptyset$, where $i_t = \overline{I}_t \cap \underline{I}_t$, as shown in FIG. 6B.

3. Relying Party RP accepts the passcode P' and set ans$\leftarrow$accept if and only if $A \neq \emptyset$.

4. Relying Party RP generates an output 660 (ans,$\{t^*, i_{t^*}\}$, state) to the high-level application and the two servers $S_B$ and $S_R$ where if ans=accept then $\{t', i_{t^*}\} \in A$ or else $\{t^*, i_{t^*}\} = \bot$, and where state 670 is the authentication state of the attempted user authentication attempt.

That is, the relying party RP will search the entire search window and will accept the passcode only if the passcode has been accepted with respect to at least one epoch in the search window.

Any ordering D can be used in principle; two practical orderings are the left-to-right ordering (t'$-$s, . . . , t'$-$1,t',1, . . . ,t'$+$s) or the alternating ordering (t',t'$+$1,t'$-$1,t'$+$2,t'$-$2, . . . ,t'$+$s,t'$-$s).

It can be shown, for any $(t, i_t) \in A$, $i_t$ can either be the empty set or a singleton.

Output item $\{t^*, i_{t^*}\}$ 660 corresponds to the updated information about the most recent (last) epoch $t^*$ that a successful authentication was performed for the token, along with the corresponding auxiliary information $i_{t^*}$ (a k-bit message), and it can be selected from set A in any arbitrary way; four practical exemplary selection policies may be selected to choose the epoch-auxiliary information pair corresponding to the minimum, maximum, median or closest epoch $t^*$ to the current Relying Party RP time t'.

Output item state 670 corresponds to secondary decision elements that may take into consideration the auxiliary information $\{i_{t_1}, i_{t_2}, \ldots, i_{t_c}\}$ that is contained in A. For instance, if silent alarms are used, then state 670 may encode the new silent alarm state of the token, and its semantic interpretation according to a given policy.

Only output item $t^*$ is necessary to be returned to servers $S_B$ and $S_R$; ans is implied by $t^*$ and pair $(i_{t^*},\text{state})$ can be concealed depending on whether the state 670 related to the auxiliary information is stored and managed at servers $S_B$ or $S_R$, or at the relying party RP.

In some cases, the information sent back to server $S_B$ can be different than the one sent back to $S_R$, i.e., the feedback sent back by RP can be asymmetric. For instance, whenever silent alarms and drifting keys are employed using pseudo-randomness provided solely b $S_B$, then the auxiliary information $i_{t^*}$ must be an output that reaches server $S_B$ so that server $S_B$ is able to appropriately process the auxiliary channel information and possibly update its local state, which in turn can be communicated back to the relying party RP.

It is noted that the main vertical-split verification protocol discussed above (and its improvements described below) can be applied even for passcodes that are split vertically not in halves but in other unequal low-order and high-order portions, e.g., when an eight-digit passcode is vertically split into a 5-digit high-order part and a 3-digit low-order part.

Improvements and Extensions

Simplified Verification Protocol. The basic protocol $\Pi_t$ can be simplified as follows, under the condition that the binary codebook B is known to both server $S_B$ and server $S_R$ (a standard assumption as B is public information), but also at the minor cost of introducing an additional round of communication between $S_B$ and $S_R$. There is no pre-processing phase at the blue server $S_B$.

Figure 7:
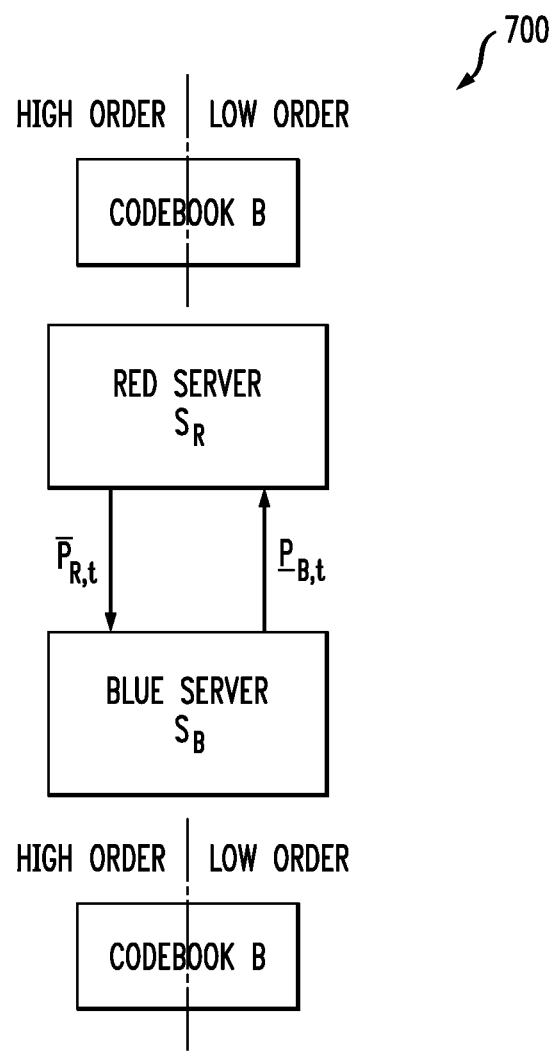
FIG. 7 illustrates an exemplary alternate first phase portion of an alternate implementation of the disclosed split-server passcode verification scheme of FIG. 3.

FIG. 7 illustrates an exemplary alternate first phase portion 700 of an alternate implementation of the disclosed split-server passcode verification scheme 300. As shown in FIG. 7, during the first phase 700, the two servers exchange information as follows:

$S_R$ sends $\overline{P}_{R,t}$ to $S_B$ and $S_B$ sends $\underline{R}_{R,t}$ to $S_R$.

During the exemplary alternate first phase portion 700, no information about codebook $C_t$ is sent to the red server $S_r$.

Figure 8:
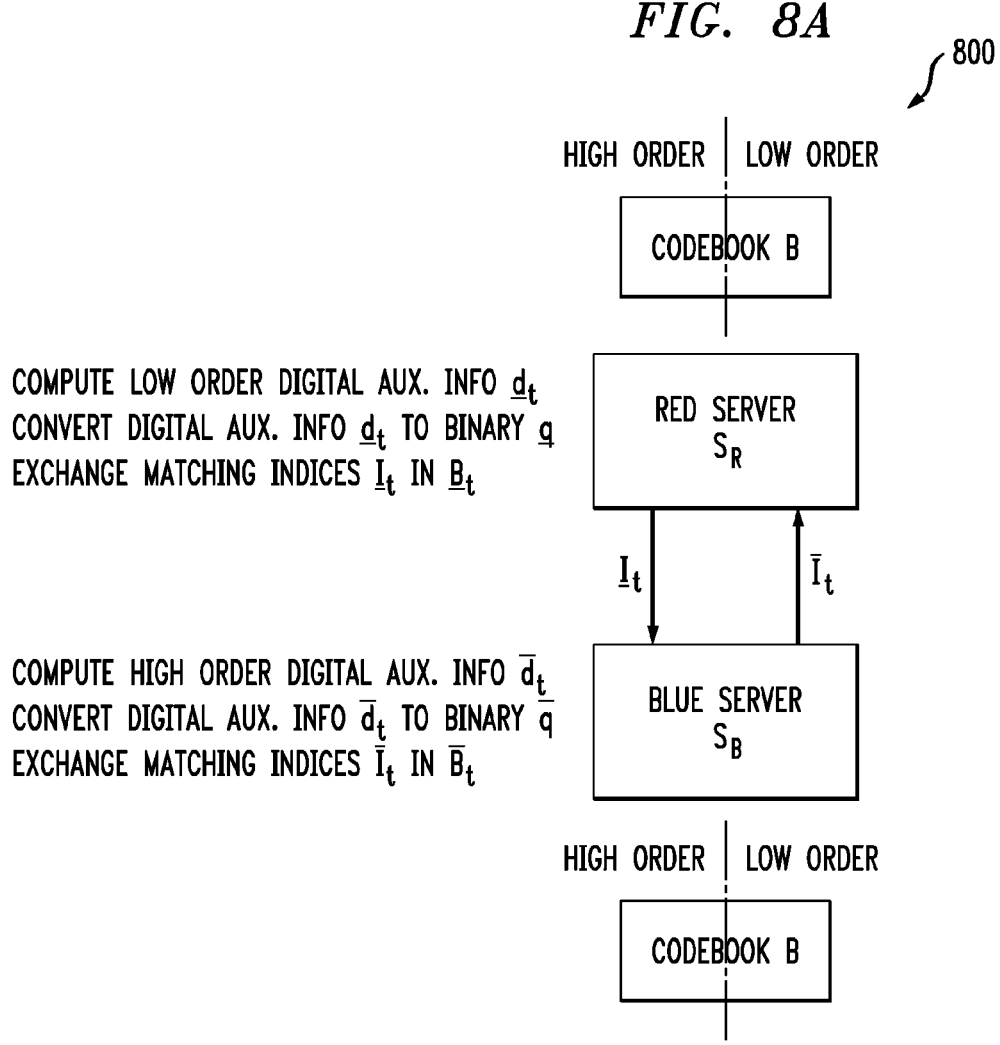
FIGS. 8A and 8B, collectively, illustrate an exemplary alternate second phase portion of the disclosed split-server passcode verification scheme of FIG. 3.

FIGS. 8A and 8B, collectively, illustrate an exemplary alternate second phase portion 800, 850 of the disclosed split-server passcode verification scheme 300. Generally, the alternate second phase 800 augments Steps iii and iv relative to the embodiment shown in FIG. 6A in each server's protocol. As discussed hereinafter, Step iii is run on the binary codewords of the binary codebook $B = \overline{B}\underline{B}$ using a slightly different (acceptance) test and Step iv is augmented by a round of interaction.

As shown in FIG. 8A, each server first computes high or low order auxiliary information $\overline{d}_t$ or $\underline{d}_t$, as discussed above in conjunction with FIG. 6A, and then maps the high or low order candidate digital codeword $\overline{d}_t$ or $\underline{d}_t$ to a corresponding high or low order binary candidate codeword $\overline{q}$ or $\underline{q}$ as follows: Every non-zero digit of $\overline{d}_t$ or $\underline{d}_t$ is changed to a 1 in $\overline{q}$ or $\underline{q}$ respectively.

Then, Step 3 runs as discussed above in conjunction with FIG. 6A, but now for each $\overline{q}_j \in \overline{B}$ or respectively for each $\underline{q}_j \in \underline{B}$, $1 \leq j \leq 2^k$ to generate output $\overline{I}_t$ and $\underline{I}_t$, respectively.

Finally, as shown in FIG. 8A, servers $S_B$ and $S_R$ exchange their outputs $\overline{I}_t$ and $\underline{I}_t$, and then as shown in FIG. 8B, both servers $S_B$ and $S_R$ compute the intersection $I' = \overline{I}_t \cap \underline{I}_t$ and proceed as follows:

if the intersection I' is not a singleton, then both servers $S_B$ and $S_R$ output $\overline{I}_t$ and $\underline{I}_t$, respectively (and terminate).

otherwise,

Let $R_{A,t}(I') = \{\overline{R}_{A,t}(I'), \underline{R}_{A,t}(I')\}$ be the pseudorandom bits $R_{A,t}(I')$ from $R_{A,t}$ that are associated with mapping binary codeword $q_{I'} \in B$ to digital codeword $c_{I'}$. Server $S_B$ sends to Server $S_R$ the pseudorandom bits $\underline{R}_{A,t}(I')$, and using $\overline{R}_{A,t}(I')$ the Server $S_B$ computes $\overline{c}_{I'}$. The Server $S_B$ finally outputs $\overline{I}_t$ if $\overline{c}_{I'} = \overline{d}_t$ or $\emptyset$ otherwise.

Using $\underline{R}_{A,t}(I')$, Server $S_R$ computes $\underline{c}_{I'}$ and finally outputs $\underline{I}_t$ if $\underline{c}_{I'} = \underline{d}_t$ or $\emptyset$ otherwise.

An advantage of this first alternate protocol is the reduction of the communication cost, as the precomputed codebook $C_t$ is no longer communicated to the server $S_R$, at the cost of slightly increasing the interaction between the two servers.

It is noted that both the basic protocol $\Pi_t$ and its simplification above can be adapted to operate in a single-server setting (where the red and blue servers may collapse to one server). In any case (single- or two-server case), by performing the test directly over the digital codebook $C_t$ with protocol $\Pi_t$ (rather than over the binary codebook B), and by using in the simplified version above the second round check (i.e., by mapping binary codeword $q_{j'}$ back to digital codeword $c_{j'}$ and checking whether candidate codeword d satisfies $d=c_{j'}$), the (single- or) two-server basic and simplified protocols strictly improve the security of the (single- or) two-server one-time passcode token system of U.S. patent application Ser. No. 13/837,259, filed Mar. 15, 2013, entitled "Configurable One-Time Authentication Tokens with Improved Resilience to Attacks," (now U.S. Pat. No. 9,270,655).

Alternate Simplified Verification Protocol. Additionally, the above protocol can be further simplified under the assumption that the trusted relying party RP knows the binary codebook B and possesses the pseudorandom information $R_{A,t}$, either by storing/producing the information explicitly or by receiving the information through an on-demand request to server $S_B$ at the beginning of the split-server passcode verification protocol, as follows:

In the alternate second phase 800 above, the final step is omitted, that is, no additional information exchange is performed between $S_B$ and $S_R$.

The high and low order $\overline{d}_t$ and $\underline{d}_t$ of the candidate digital codeword are included in the outputs $\overline{I}_t$ and respectively $\underline{I}_t$ of the basic protocol.

Figure 9:
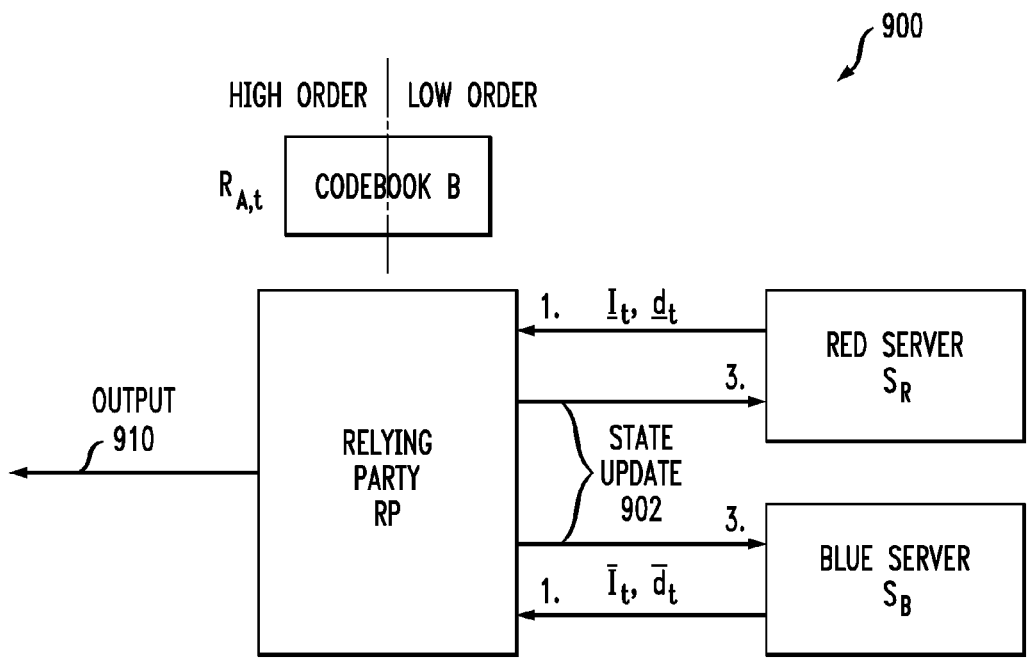
FIG. 9 illustrates an exemplary alternate verification portion of the disclosed split-server passcode verification scheme of FIG. 3.

The general verification protocol is slightly modified to perform the additional test with respect to the digital codeword $c_{j'}$ as follows:

FIG. 9 illustrates this exemplary alternate verification portion 900 of the disclosed split-server passcode verification scheme 300. As shown in FIG. 9, the servers $S_B$ and $S_R$ send the Relying Party RP their outputs $\overline{I}_t$ and $\overline{d}_t$ and $\underline{I}_t$ and $\underline{d}_t$, respectively, during Step 1. The Relying Party RP accepts the passcode P' with respect to epoch t during Step 2 if and only if (1) $\overline{I}_t \cap \underline{I}_t = i_t \neq \emptyset$, (2) $i_t$ is a singleton and (3) Using pseudorandom bits $R_{A,t}(i_t)$ from $R_{A,t}$, binary codeword $b_{i_t}$ is mapped to digital codeword $c_{i_t}$ so that $c_{i_t} = \overline{d}_t \underline{d}_t$.

Relying Party RP generates an output 910 (ans,{t*,i$_{t^*}$}, state) to the high-level application and the two servers $S_B$ and $S_R$ where if ans=accept then {t*,i$_{t^*}$}∈A or else {t*, i$_{t^*}$}=⊥, and where state update 920 is the authentication state of the attempted user authentication attempt.

Thus, in this case, even though the client-side management of the information related to the auxiliary channel is asymmetric, the corresponding server-side management of this information is completely symmetric.

Extended Verification Protocol. The exemplary basic protocol $\Pi_t$ can be extended to allow incorporation with the recent chaff-based split-server verification protocol disclosed in U.S. patent application Ser. No. 13/795,801, filed Mar. 12, 2013, entitled "Distributed Cryptography Using Distinct Value Sets Each Comprising at Least One Obscured Secret Value," thus extending this protocol to be compatible with the existence of an auxiliary channel, as follows.

There is no pre-processing phase at the blue server $S_B$.

In the first phase, in addition to the information exchanged in U.S. patent application Ser. No. 13/795,801, filed Mar. 12, 2013, entitled "Distributed Cryptography Using Distinct Value Sets Each Comprising at Least One Obscured Secret Value," namely values $s_R = P_{B,t} - \sigma_{R,j_{t,B}}$ and $s_B = P_{R,t} - \sigma_{B,j_{t,R}}$ as explained in the section entitled "Lightweight Split-Server Verification," $S_B$ sends to $S_R$ codebook $C_t$.

In the second phase, the protocol involves running the (joint-computation) protocol of U.S. patent application Ser. No. 13/795,801, at the end of which server $S_B$ has computed set $K_{t,B}$ and $S_R$ has computed set $K_{t,R}$ such that the (correct for epoch t) combined protocode $P_{B,t} + P_{R,t} = K_{t,R} \cap K_{t,B}$, $|K_{t,B}| = |K_{t,R}| = 1$. Here, regular addition operator + can be alternatively replaced by digit-wise modulo 10 addition operator $\oplus$. Then Step ii of the second phase is changed so that for each passcode $P \in K_{t,B}$ (resp. $P \in K_{t,R}$) a corresponding candidate di ital codeword d is computed as $d = P_t' \ominus P$, where $P_t'$ is the candidate passcode provided by the user. Accordingly, Step iii of the second phase is changed so that each such candidate digital codeword d is checked against any possible digital codeword $c_j$ in $C_t$ and each server outputs its local verification decision appropriately accepting the passcode $P_t'$ if and only if there exists j such that $c_j = d$ for some codeword d of the $|K_{t,B}| = |K_{t,R}| = 1$ codewords computed in Step ii. That is, conventionally we can define $\overline{I}_t$ (respectively $\underline{I}_t$) to be the set of pairs (j, $P_j$) of matching indices j computed by Server $S_B$ (respectively by Server $S_R$) and its corresponding protocode $P_j$ in set $K_{t,B}$ (respectively set $K_{t,R}$) that produced the corresponding digital codeword d matching the codebook in position j, or ⊥ if no such matching index was found.

Accordingly, the general verification protocol acceptance test $\overline{I}_t \cap \underline{I}_t \neq \emptyset$ in Step 2 is augmented to further test that this non-empty intersection is a singleton set (j, $P_i$), and then accordingly $i_t$ is set to j.

It is noted that the split-server verification protocols described above (in the section entitled "Server Side Verification Protocol," the two alternative simplified versions thereof, and the extension above), all maintain a minimum desired level of security in the event of an ephemeral or permanent server being compromised: By successfully compromising one server, the search space of the attacker is reduced only to half, e.g., for 8-digit passcodes, the OTP system still maintains a desired 4-digit security.

Extensions for General Auxiliary-Channel Compatibility. As apparent to one skilled in art, the last protocol takes the particular split-server verification protocol of U.S. patent application Ser. No. 13/795,801, filed Mar. 12, 2013, entitled "Distributed Cryptography Using Distinct Value Sets Each Comprising at Least One Obscured Secret Value" (a protocol that is also described above and does not support the use of an auxiliary channel) and applies to it the ideas, described herein in the main protocol of the section entitled "Server Side Verification Protocol," around the split-server verification of passwords of the form $$P_t = P_{R,t} \oplus P_{B,t} \oplus c_t,$$

which do support the use of an auxiliary channel, referred to herein as auxiliary-information enriched passcodes.

Figure 10:
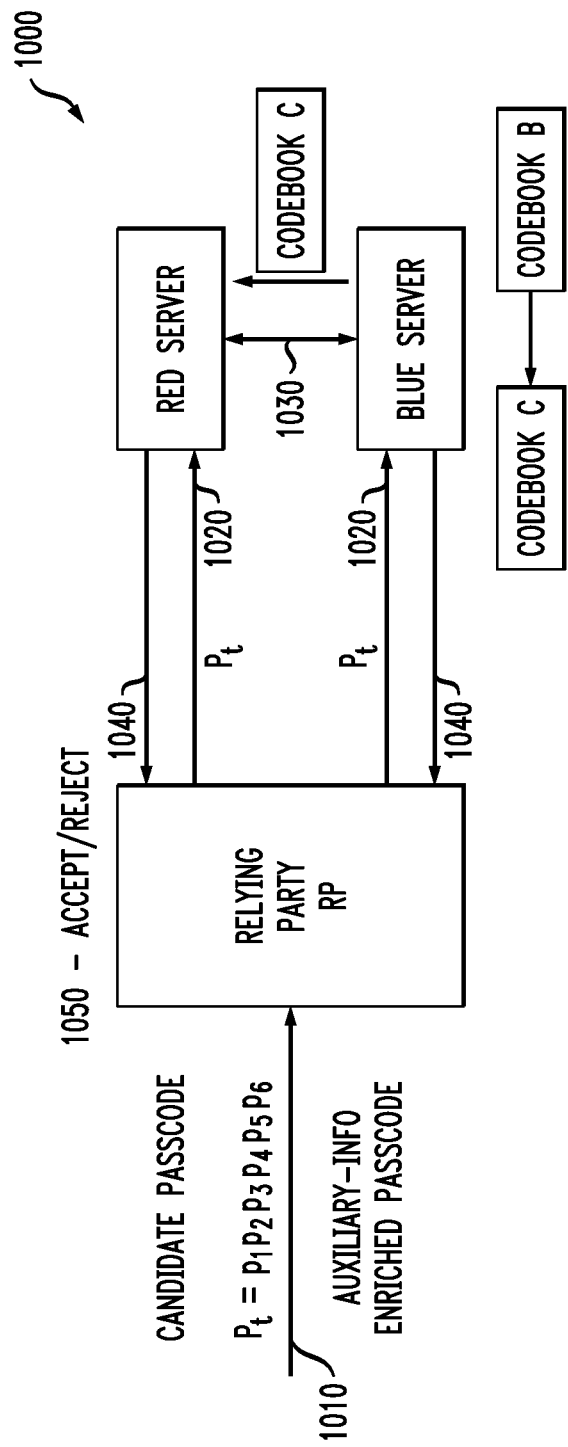
FIGS. 10, 11 and 12 illustrate alternative exemplary split-server passcode verification processes incorporating aspects of the invention related to auxiliary channel support.

In general, auxiliary-information enriched passcodes require shared knowledge of the underlying codebook $C_t$ used to map auxiliary messages into offsets of the protocode for formation of the final produced passcodes. In the exemplary embodiments of the present invention, an asymmetric auxiliary-channel model of U.S. patent application Ser. No. 13/837,259, filed Mar. 15, 2013, entitled "Configurable One-Time Authentication Tokens with Improved Resilience to Attacks" (now U.S. Pat. No. 9,270,655) is adopted, where the secret (digital) codebook $C_t$ (that is used by the auxiliary channel) is computed only by the blue server $S_B$ tranforming a publicly known (binary) codebook B in a non-deterministic way using pseudorandom information $R_{A,t}$ (produced only by the blue server $S_B$). Accordingly, in order for any split-server verification protocol, supporting passcodes that are not enriched with auxiliary information, to operate in this asymmetric auxiliary-channel model, there is a need to make the codebook $C_t$ also available to the red server $S_R$ and/or the relying party RP. That is, any given split-server verification protocol of non-enriched passcodes that is appropriately augmented to support verification of also auxiliary-information enriched passcodes in the asymmetric auxiliary channel model discussed above will necessarily need to provide one or more of the three involved parties (the red and blue servers and the relying party) with access to underlying secret codebook $C_t$. This necessary task can be realized using the techniques presented above. Collectively, aspects of the present invention provide three methods to make $C_t$ available to the involved parties during the split-server verification protocol of auxiliary-information enriched passcodes:

1. Explicit Codebook Transmission: In this case, as described in the main protocol of the section entitled "Server Side Verification Protocol," the codebook $C_t$ is explicitly (possibly partially) transmitted to server $S_R$. FIG. 10 illustrates an exemplary split-server passcode verification process 1000 incorporating auxiliary channel support aspects of the invention. As shown in FIG. 10, the exemplary split-server passcode verification process 1000 is initiated during step 1010 when an auxiliary-information enriched candidate passcode $P_t$ is presented to a relying party RP.

The candidate passcode $P_t$ is provided to each server $S_B$ and $S_R$ during step 1020. As indicated above in conjunction with FIG. 1, the candidate passcode $P_t$ supports the auxiliary channel. The candidate passcode $P_t$ is thus a passcode that optionally embeds auxiliary information. The two servers $S_B$ and $S_R$ exchange information during step 1030. The codebook $C_t$ is at least partially explicitly transmitted to server $S_R$ during step 1030. The servers $S_B$ and $S_R$ return a verification to the relying party RP during step 1040 indicating whether passcode $P_t$ or their respective portion of passcode $P_t$ has been verified with respect to a valid codeword of codebook $C_t$ that consistently encodes a unique auxiliary-channel message. The final verification is performed by the relying party RP in a similar (but not necessarily the same) process with the one discussed above in conjunction with FIG. 6B. Generally, the relying party RP authenticates the user during step 1050 if and only if both servers $S_B$ and $S_R$ verify the auxiliary-information enriched candidate passcode $P_t$ or their respective portion of $P_t$.

Figure 11:
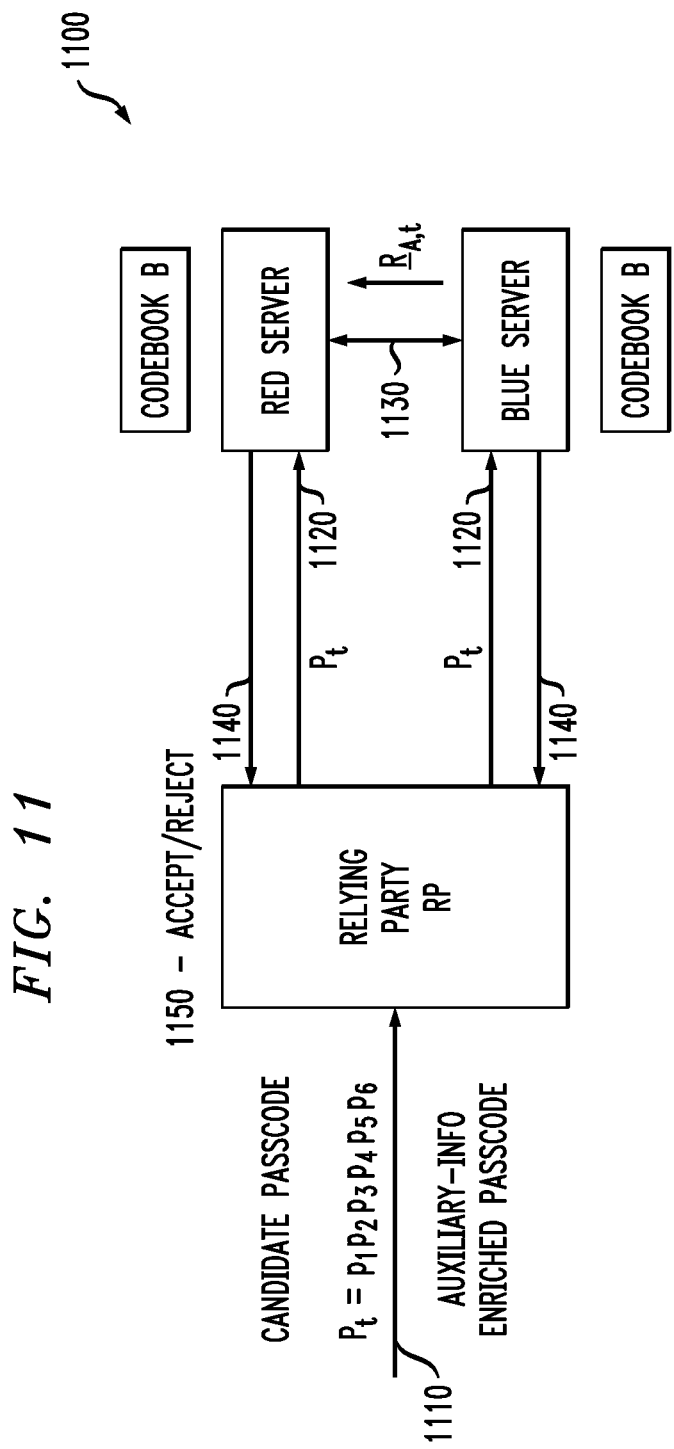

2. Implicit Codebook Computation and Codeword Checking: In this case, the non-deterministic computation of codebook $C_t$ is enabled by transmitting the pseudorandom information $R_{A,t}$ as a whole or partially to some party; then, computation is performed implicitly on a codeword basis. That is, an appropriate codeword in B is first selected, for deriving the auxiliary-information message, and only then this binary codeword is non-deterministically mapped to its equivalent digital codeword for verification. Depending on which party performs the above process, the following are further distinguished:

(a) Server-Side Processing: The above decoding and checking is performed at the server(s), as in the first simplified protocol of the main protocol. FIG. 11 illustrates an exemplary split-server passcode verification process 1100 incorporating server-side auxiliary channel support aspects of the invention. As shown in FIG. 11, the exemplary split-server passcode verification process 1100 is initiated during step 1110 when an auxiliary-information enriched candidate passcode $P_t$ is presented to a relying party RP.

The auxiliary-information enriched candidate passcode $P_t$ is provided to each server $S_B$ and $S_R$ during step 1120. The two servers $S_B$ and $S_R$ exchange information during step 1130. The pseudorandom information $R_{A,t}$ is transmitted to server $S_R$ during step 1130. An appropriate codeword from codebook B is selected for deriving the auxiliary-information message, and only then this binary codeword is mapped to its equivalent digital codeword for verification.

The servers $S_B$ and $S_R$ return a verification to the relying party RP during step 1140 indicating whether passcode $P_t$ or their respective portion of passcode $P_t$ has been verified first with respect to a valid binary codeword of codebook B that consistently encodes a unique auxiliary-channel message and second with respect to the digital codeword (in codebook $C_t$) corresponding to the first binary codeword in B. The final verification is performed by the relying party RP in a similar (but not necessarily the same) process with the one discussed above in conjunction with FIG. 8B. Generally, the relying party RP authenticates the user during step 1150 if and only if both servers $S_B$ and $S_R$ verify the auxiliary-information enriched candidate passcode $P_t$ or their respective portion of $P_t$.

Figure 12:
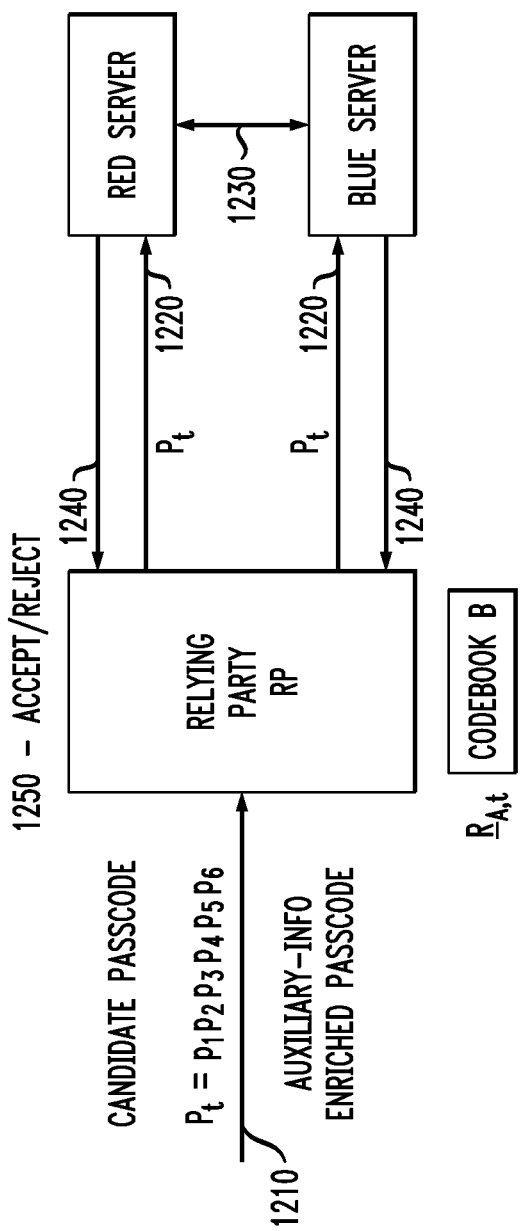

(b) Relying-Party Processing: The above decoding and checking is performed at the relying party RP, as in the second simplified protocol of the main protocol. FIG. 12 illustrates an exemplary split-server passcode verification process 1200 incorporating relying party processing of the auxiliary channel information. As shown in FIG. 12, the exemplary split-server passcode verification process 1200 is initiated during step 1210 when an auxiliary-information enriched candidate passcode $P_t$ is presented to a relying party RP.

The auxiliary-information enriched candidate passcode $P_t$ is provided to each server $S_B$ and $S_R$ during step 1220. The two servers $S_B$ and $S_R$ exchange information during step 1230. The servers $S_B$ and $S_R$ return a verification to the relying party RP during step 1240 indicating whether passcode $P_t$ or their respective portion of passcode $P_t$ has been verified with respect to a valid binary codeword of codebook B that consistently encodes a unique auxiliary-channel message. The final verification is performed by the relying party RP in a similar (but not necessarily the same) process with the one discussed above in conjunction with FIG. 9. Generally, the relying party RP authenticates the user during step 1250 if and only if both servers $S_B$ and $S_R$ verify the auxiliary-information enriched candidate passcode $P_t$ or their respective portion of $P_t$ and RP further verifies $P_t$ with respect to a valid digital codeword in codebook $C_t$. The latter step is performed as follows. An appropriate codeword from codebook B is selected by the relying party RP for deriving the auxiliary-information message, and only then this binary codeword is mapped to its equivalent digital codeword for verification, using the pseudorandom information $R_{A,t}$.

It is noted that the above codebook-handling processes can be applied to any generic split-server passcode verification protocol of the following form: A candidate passcode $P_t'$ is provided as input to servers $S_R$ and $S_B$, the two servers exchange information and compute a local output (possibly in multiple rounds) that is finally sent to the relying party RP which accepts or rejects $P_t'$. Whenever access to the underlying secret codebook $C_t$ is required during the computation, one of the three codebook accessing methods described above is employed. Therefore, aspects of the current invention introduce a design framework for constructing methods for split-server verification of auxiliary-information enriched passcodes in the asymmetric auxiliary-channel model. In particular, given any split-server verification protocol of non-enriched passcodes (e.g., like the one in U.S. patent application Ser. No. 13/795,801, filed Mar. 12, 2013, entitled "Distributed Cryptography Using Distinct Value Sets Each Comprising at Least One Obscured Secret Value")

the exemplary framework proposes three ways to extend this protocol to the verification of enriched passcodes. Moreover, given any split-server verification protocol of enriched passcodes in the symmetric auxiliary-channel model, where the codebook is composed by red and blue portions locally available to $S_R$ and $S_B$ (e.g., like the ones in U.S. patent application Ser. No. 13/404,737, filed Feb. 24, 2012, entitled "Method and Apparatus for Authenticating a User Using Multi-Server One-Time Passcode Verification" (now U.S. Pat. No. 9,118,661)) the exemplary framework proposes three ways to realize this protocol also in the asymmetric auxiliary-channel model.

The foregoing applications and associated embodiments should be considered as illustrative only, and numerous other embodiments can be configured using the techniques disclosed herein, in a wide variety of different cryptography applications.

For example, both the vertical splitting and the auxiliary-channel handling methods described herein can be extended in the case of more than two servers, assuming a token-side design that supports such extensions. For instance, if a passcode comprises of three protocode parts, say red, blue and green, then vertical splitting can be considered into three corresponding parts. Splitting into more parts than the number of protocodes is also possible if the appropriate pseudorandom information is appropriately disseminated among the servers. Similarly, auxiliary-channel handling can be supported in multi-server settings.

In addition, while the present invention is illustrated herein using a high-order (or most significant) half and a low-order (or least significant) half of the protocode, the invention can be applied using high-order (or most significant) portions and low-order (or least significant) portions of the protocode that have an unequal length and/or more than two portions.

It should also be understood that split-server verification, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described herein can provide a number of significant advantages relative to conventional practice. For example, these embodiments can advantageously provide improved scalability and support of auxiliary channels. Also, a wide variety of different OTP verification protocols can be implemented using the disclosed techniques.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 13:
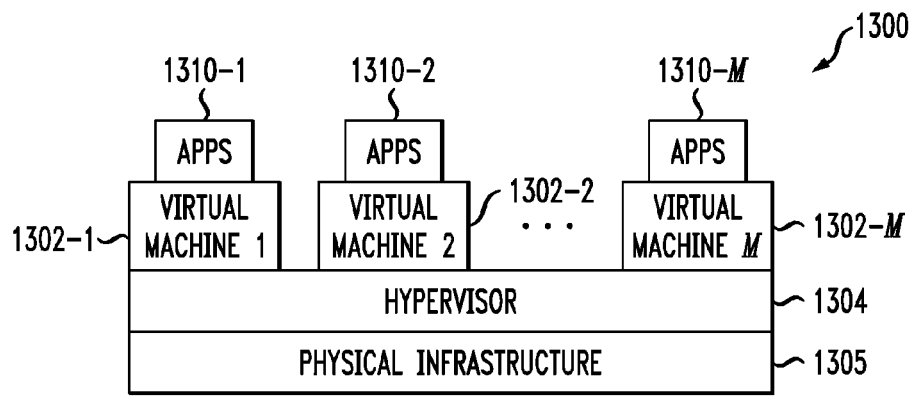
FIG. 13 illustrates an exemplary processing platform that may be used to implement at least a portion of one or more embodiments of the invention comprising a cloud infrastructure.

Referring now to FIG. 13, one possible processing platform that may be used to implement at least a portion of one or more embodiments of the invention comprises cloud infrastructure 1300. The cloud infrastructure 1300 in this exemplary processing platform comprises virtual machines (VMs) 1302-1, 1302-2, . . . 1302-M implemented using a hypervisor 1304. The hypervisor 1304 runs on physical infrastructure 1305. The cloud infrastructure 1300 further comprises sets of applications 1310-1, 1310-2, . . . 1310-M running on respective ones of the virtual machines 1302-1, 1302-2, . . . 1302-M under the control of the hypervisor 1304.

The cloud infrastructure 1300 may encompass the entire given system or only portions of that given system, such as one or more of client, servers, controller, authentication server or relying server in the system.

Although only a single hypervisor 1304 is shown in the embodiment of FIG. 13, the system may of course include multiple hypervisors each providing a set of virtual machines using at least one underlying physical machine.

An example of a commercially available hypervisor platform that may be used to implement hypervisor 1304 and possibly other portions of the system in one or more embodiments of the invention is the VMware® vSphere™ which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system.

Figure 14:
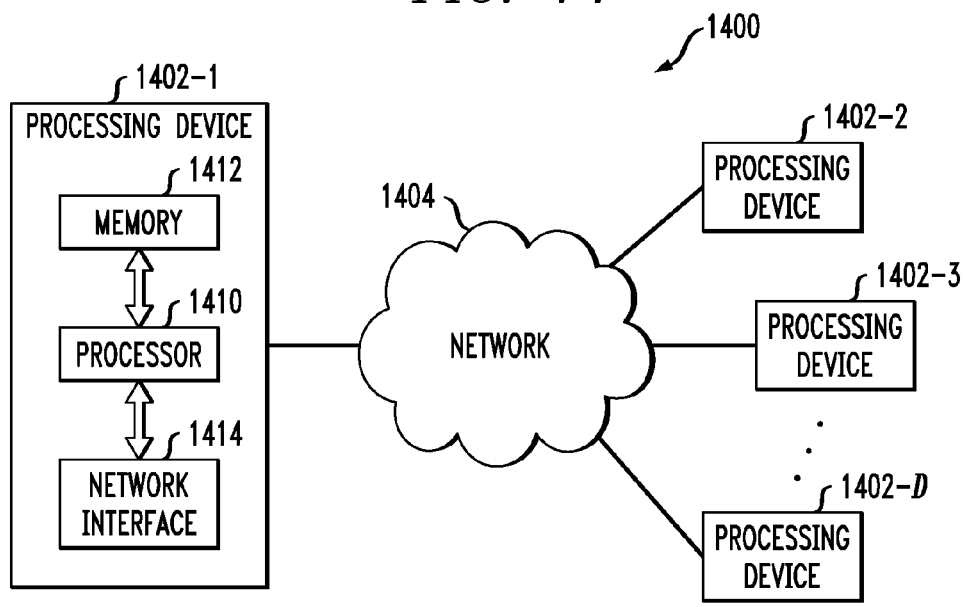
FIG. 14 illustrates another exemplary processing platform that may be used to implement at least a portion of one or more embodiments of the invention.

Another example of a processing platform is processing platform 1400 shown in FIG. 14. The processing platform 1400 in this embodiment comprises at least a portion of the given system and includes a plurality of processing devices, denoted 1402-1, 1402-2, 1402-3 . . . 1402-D, which communicate with one another over a network 1404. The network 1404 may comprise any type of network, such as a WAN, a LAN, a satellite network, a telephone or cable network, a cellular network, a wireless network such as WiFi or WiMAX, or various portions or combinations of these and other types of networks.

The processing device 1402-1 in the processing platform 1400 comprises a processor 1410 coupled to a memory 1412. The processor 1410 may comprise as microprocessor, a microcontroller, an ASIC, an FPGA or other type of processing circuitry, as well as portions or combinations of such circuitry elements, and the memory 1412, which may be viewed as an example of a "computer program product" having executable computer program code embodied therein, may comprise RAM, ROM or other types of memory, in any combination.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 13 or 14, or each such element may be implemented on a separate processing platform.

As is known in the art, the methods and apparatus discussed herein may be distributed as an article of manufacture that itself comprises a machine readable recordable storage medium containing one or more programs. The one or more programs are operable, in conjunction with a computer system, to carry out all or some of the steps to perform the methods or create the apparatuses discussed herein.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for authenticating a user, comprising: receiving an authentication passcode generated by a token associated with said user, wherein the received authentication passcode comprises a high-order portion and a low-order portion;
providing the received authentication passcode to a first authentication server and a second authentication server; and
authenticating the user based on the received authentication passcode using at least the first authentication server and the second authentication server, wherein said first authentication server verifies the high-order portion of the received authentication passcode and wherein said second authentication server verifies the low-order portion of the received authentication passcode, wherein a binary codebook B is used to embed additional auxiliary information into said authentication passcode.

2. The method of claim 1, wherein said received authentication passcode is based on one or more of at least two protocodes $P_{R,t}$ and $P_{B,t}$ generated by said token and pseudorandom information $R_{A,t}$.

3. The method of claim 2, further comprising a pseudorandom generation of a codebook $C_t$ based on said pseudorandom information $R_{A,t}$, wherein said codebook $C_t$ is used to embed additional auxiliary information into said authentication passcode.

4. The method of claim 1, wherein said first authentication server and said second authentication server return a verification to a relying party RP indicating whether a respective portion of the received authentication passcode has been partially verified.

5. The method of claim 4, wherein said relying party RP authenticates the user if both said first authentication server and said second authentication server verify a respective portion of the received authentication passcode.

6. The method of claim 4, wherein said first authentication server computes high order auxiliary information comprising a high order candidate codeword embedded in said received authentication passcode and determines one or more high order matching indices between said high order embedded codeword and a high order portion of a codeword of a corresponding codebook and wherein said second authentication server computes low order auxiliary information comprising a low order candidate codeword embedded in said received authentication passcode and determines one or more low order matching indices between said low order embedded codeword and a low order portion of a codeword of a corresponding codebook.

7. The method of claim 6, wherein said relying party RP accepts said received authentication passcode if said high order matching indices and low order matching indices have a non-empty intersection.

8. The method of claim 7, wherein said relying party RP provides an output to an application indicating whether said received authentication passcode is accepted.

9. The method of claim 7, wherein said relying party RP provides a status update to said first authentication server and said second authentication server indicating an authentication state of said attempted authentication.

10. The method of claim 1, wherein said first authentication server computes high order auxiliary information comprising a high order candidate digital codeword embedded in said received authentication passcode and maps said high order digital codeword to a high order binary candidate codeword and determines one or more high order matching indices between said high order binary candidate codeword and a high order portion of a binary codebook and wherein said second authentication server computes low order auxiliary information comprising a low order candidate digital codeword embedded in said received authentication passcode and maps said low order digital codeword to a low order binary candidate codeword and determines one or more low order matching indices between said low order binary candidate codeword and a low order portion of a binary codebook.

11. The method of claim 10, wherein said first authentication server and said second authentication server determine an intersection of said high order and low order matching indices, determine a binary high order codeword and a binary low order codeword corresponding to said intersection and correspondingly verify said binary high order codeword and said binary low order codeword with respect to said high order candidate digital codeword and said low order candidate digital codeword embedded in said received authentication passcode.

12. The method of claim 1, wherein a relying party RP stores a binary codebook B and pseudorandom information $R_{A_t}$ and wherein said first authentication server provides said relying party RP with a high order candidate digital codeword and one or more high order matching indices in a high order portion of said binary codebook and wherein said second authentication server provides said relying party RP with a low order candidate digital codeword and one or more low order matching indices in a low order portion of said binary codebook.

13. The method of claim 12, wherein said relying party RP accepts said received authentication passcode if said high order matching indices and low order matching indices have a non-empty intersection, said intersection is a singleton and using pseudorandom bits $R_{A,t}(i_t)$ from said pseudorandom information $R_{A_t}$, a binary codeword $b_{i_t}$ is mapped to a digital codeword $c_{i_t}$ so that said codeword $c_{i_t}$ comprises said high order candidate digital codeword concatenated by said low order candidate digital codeword.

14. The method of claim 1, further comprising the step of computing a combined first and second protocode $P_{B,t} \oplus P_{R,t}$ based on a computed chaff set $K_{t,B}$ of said first authentication server and a computed chaff set $K_{t,R}$ of said second authentication server $S_R$, and wherein for each passcode $P \in K_{t,B}$ (respectively each passcode $P \in K_{t,R}$) a corresponding candidate digital codeword d is computed as $d = P_t' \ominus P$, where $P_t'$ is the candidate passcode provided by the user; and wherein each candidate digital codeword d is checked against one or more possible digital codeword $c_j$ in a codebook $C_t$ and said first and second authentication servers output a corresponding local verification decision accepting the passcode $P_t'$ if there exists a j such that $c_j = d$.

15. An apparatus for authenticating a user, the apparatus comprising:
a memory; and
at least one hardware device, coupled to the memory, operative to implement the following steps:
receiving an authentication passcode generated by a token associated with said user, wherein the received authentication passcode comprises a high-order portion and a low-order portion;
providing the received authentication passcode to a first authentication server and a second authentication server; and
authenticating the user based on the received authentication passcode using at least the first authentication server and the second authentication server, wherein said first authentication server verifies the high-order portion of the received authentication passcode and wherein said second authentication server verifies the low-order portion of the received authentication passcode, wherein a binary codebook B is used to embed additional auxiliary information into said authentication passcode.

16. The apparatus of claim 15, wherein said received authentication passcode is based on one or more of at least two protocodes $P_{R,t}$ and $P_{B,t}$ generated by said token and pseudorandom information $R_{A,t}$.

17. The apparatus of claim 16, further comprising a pseudorandom generation of a codebook $C_t$ based on said pseudorandom information $R_{A,t}$, wherein said codebook $C_t$ is used to embed additional auxiliary information into said authentication passcode.

18. The apparatus of claim 1, wherein said first authentication server and said second authentication server return a verification to a relying party RP indicating whether a respective portion of the received authentication passcode has been partially verified.

19. The apparatus of claim 18, wherein said relying party RP authenticates the user if both said first authentication server and said second authentication server verify a respective portion of the received authentication passcode.

20. The apparatus of claim 18, wherein said first authentication server computes high order auxiliary information comprising a high order candidate codeword embedded in said received authentication passcode and determines one or more high order matching indices between said high order embedded codeword and a high order portion of a codeword of a corresponding codebook and wherein said second authentication server computes low order auxiliary information comprising a low order candidate codeword embedded in said received authentication passcode and determines one or more low order matching indices between said low order embedded codeword and a low order portion of a codeword of a corresponding codebook.

21. The apparatus of claim 20, wherein said relying party RP accepts said received authentication passcode if said high order matching indices and low order matching indices have a non-empty intersection.

22. The apparatus of claim 15, wherein a relying party RP stores a binary codebook B and pseudorandom information $R_{A_t}$ and wherein said first authentication server provides said relying party RP with a high order candidate digital codeword and one or more high order matching indices in a high order portion of said binary codebook and wherein said second authentication server provides said relying party RP with a low order candidate digital codeword and one or more low order matching indices in a low order portion of said binary codebook.

23. The apparatus of claim 22, wherein said relying party RP accepts said received authentication passcode if said high order matching indices and low order matching indices have a non-empty intersection, said intersection is a singleton and using pseudorandom bits $R_{A,t}(i_t)$ from said pseudorandom information $R_{A_t}$, a binary codeword $b_{i_t}$ is mapped to a digital codeword $c_{i_t}$ so that said codeword $c_{i_t}$ comprises said high order candidate digital codeword concatenated by said low order candidate digital codeword.

24. An article of manufacture for authenticating a user, comprising a non-transitory machine readable recordable storage medium containing one or more programs which when executed implement the steps of:
receiving an authentication passcode generated by a token associated with said user, wherein the received authentication passcode comprises a high-order portion and a low-order portion;
providing the received authentication passcode to a first authentication server and a second authentication server; and
authenticating the user based on the received authentication passcode using at least the first authentication server and the second authentication server, wherein said first authentication server verifies the high-order portion of the received authentication passcode and wherein said second authentication server verifies the low-order portion of the received authentication passcode, wherein a binary codebook B is used to embed additional auxiliary information into said authentication passcode.

* * * * *

UNITED STATES PATENT AND TRADEMARK OFFICE
CERTIFICATE OF CORRECTION

PATENT NO. : 9,454,654 B1
APPLICATION NO. : 14/144707
DATED : September 27, 2016
INVENTOR(S) : Triandopoulos et al.

It is certified that error appears in the above-identified patent and that said Letters Patent is hereby corrected as shown below:

Column 1, Line 42, insert the following after "Secret Value,"" --(now U.S. Pat. No. 9,037,858),--.

Column 5, Line 14, replace "Tokens") and drifting keys" with --Tokens," (now U.S. Pat. No. 9,515,989)) and drifting keys--.

Column 5, Line 16, replace "Compromise Detection")." with --Compromise Detection," (now U.S. Pat. No. 8,699,713)).--.

Column 7, Line 19, replace "Secret Value." The technique" with --Secret Value," (now U.S. Pat. No. 9,037,858). The technique--.

Column 9, Line 48, replace "$P_{R,t} \oplus B_{B,t}$" with --$P_{R,t} \oplus P_{B,t}$--.

Column 11, Line 6, insert --iv.--.

Column 12, Line 24, replace "$\underline{R}_{R,t}$ to $S_R$" to --$\underline{P}_{R,t}$ to $S_R$--.

Column 13, Line 56, insert the following after "Secret Value,"" --(now U.S. Pat. No. 9,037,858),--.

Column 13, Lines 62-63, insert the following after "Secret Value,"" --(now U.S. Pat. No. 9,037,858),--.

Column 14, Line 1, insert the following after "13/795,801," --(now U.S. Pat. No. 9,037,858),--.

Column 14, Line 8, replace "di ital codeword" with --digital codeword--.

Column 14, Line 41, insert the following after "Secret Value"" --(now U.S. Pat. No. 9,037,858)--.

Column 16, Line 67, insert the following after "Secret Value" --(now U.S. Pat. No. 9,037,858)--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*